United States Patent Office 3,463,813
Patented Aug. 26, 1969

---

3,463,813
DIAZAPHOSPHORUS RING COMPOUNDS AND PROCESS FOR PREPARATION THEREOF
Richard T. Dickerson, Midland, Mich., assignor to The Dow Chemical Company, Midland, Mich., a corporation of Delaware
No Drawing. Filed Sept. 21, 1964, Ser. No. 398,069
Int. Cl. C07d *105/02*
U.S. Cl. 260—551                    8 Claims This invention relates to new compounds and a process for preparation thereof. More specifically, this invention relates to heterocyclic compounds having hexahydrodiazaphosphorine or diazaphospholidine cyclic rings therein. For simplicity such rings are hereinafter sometimes referred to as "diazaphosphorus rings."

The compounds of this invention are capable of being converted to polymeric products suitable for forming fibers and films which can be used for various purposes appropriate for such shaped articles, such as textiles, clothing, protective coatings, etc., as disclosed in applicant's copending application Ser. No. 398,083 filed the same date herewith, now U.S. Patent No. 3,304,270.

The compounds of this invention are heterocyclic compounds or "diazaphosphorus ring compounds" of the formula

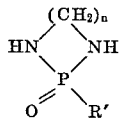

wherein $n$ is 2 or 3; R' is NR''$_2$, OR'' or R'' group, and R'' is an aliphatic, cycloaliphatic or aromatic hydrocarbon group having no more than 20, preferably no more than 6 carbon atoms.

Typical hydrocarbon groups that can be used for R' and R'' include: methyl, ethyl, propyl, butyl, amyl, hexyl, octyl, decyl, octadecyl, dodecyl, vinyl, allyl, butenyl, butadienyl, cyclohexyl, propargyl, cyclopentyl, cyclohexenyl, cyclopentadienyl, methylcyclohexyl, ethylcyclohexyl, methylcyclopentyl, phenyl, tolyl, xylyl, ethylphenyl, propylphenyl, butylphenyl, naphthyl, methylnaphthyl, ethylnaphthyl, octylnaphthyl, biphenylyl, methylbiphenylyl, ethylbiphenylyl, etc.

Typical oxyhydrocarbon radicals that can be used for R' include: methoxy, ethoxy, butoxy, hexoxy, octoxy, vinyloxy, allyloxy, butenyloxy, butadienyloxy, propargyloxy, cyclohexyloxy, cyclopentoxy, methyl cyclohexoxy, methyl cyclopentoxy, phenoxy, tolyloxy, xylyloxy, naphthoxy, methylnaphthoxy, biphenylyloxy, etc.

A typical heterocyclic compound of this invention is 2 - diphenylamino - 1,3,2 - diazaphospholidine - 2 - oxide which has the formula

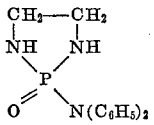

Another typical compound is 2-diphenylamino-hexahydro - 1,3,2-diazaphosphorine-2-oxide which has the formula

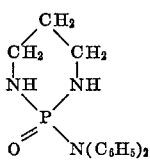

The compounds of this invention can be prepared by condensing ethylene diamine or trimethylene diamine with a phosphorus compound of the formula R'POX$_2$ wherein X is halogen and R' is as defined above. No particular reaction conditions or catalysts are necessary to promote the reaction. While the bromide, fluoride and iodide phosphorus compounds can be used satisfactorily, the chloride which is more easily available and less expensive, is preferred.

Solvents suitable for conducting the reactions will vary according to the particular reagents being used. In many cases, the products are soluble in the solvent used for the reagents. Solvents suitable for such reactions include: methylene chloride, chloroform, ethylene chloride, trichloroethane, etc.

These preparations are best illustrated by the following examples. These examples are intended merely for illustrative purposes and are not intended to restrict in any way the scope of the invention nor the manner in which the invention can be practiced. Unless specifically indicated otherwise, here and throughout the specification parts and percentages are given by weight.

Example I

A solution of 48 parts ethylene diamine in 500 parts of methylene chloride is prepared by stirring a mixture thereof. The solution is cooled to 5° C. in an ice bath and then to this is added dropwise a filtered solution of 22 parts diphenyl-phosphoramidic dichloride in 300 parts of methylene chloride over a period of about 4 hours. The mixture is then permitted to stand overnight. From this the precipitated solids are filtered, and the filtrate is evaporated to recover the solute. There is thus obtained a product which when recrystallized from 2-propanol gives a recovery of 25 parts having a melting point of 180–182° C. The precipitated solids recovered by the filtering operation are extracted with water to remove amine salt, and then dried. This residue amounts to 57 parts and has a melting point of approximately 177° C. This product is insoluble in methylene chloride in its recovered form. However, upon being dissolved in methanol and then recovered by evaporation of the methanol, the recovered solid is soluble in methylene chloride and is identical to the solute recovered from the evaporated filtrate. The apparent difference in methylene chloride solubility of the crude material is believed to be due to a difference in crystalline form as compared with the same compound recovered from the methylene chloride solution. This product is identified as 2-diphenylamino-1,3,2-diazaphospholidine-2-oxide.

Example II

The procedure of the preceding example is repeated except that an equivalent amount of 1-3-propane diamine is used in place of the ethylene diamine. The 2-diphenylamino-hexahydro - 1,3,2 - diazaphosphorine oxide product has a melting point of 169–170° C. When the procedure is repeated using phosphoryl dihalides (R'POCl$_2$) with different R' groups respectively, the corresponding products are obtained such as for example:

2-phenyl-hexahydro-1,3,2-diazaphosphorine oxide having a melting point of 138–141° C.;
2-dimethylamino-hexahydro-1,3,2-diazaphosphorine oxide having a melting point of 127–130° C.;
2-methyl-hexahydro-1,3,2-diazaphosphorine oxide having a melting point of 116–121° C.

Example III

With the reaction temperature maintained at 15° C., a solution of 105 parts of phenyl phosphorodichloridate in 200 parts of chloroform is added with stirring to a solution of 82 parts 1,3-propanediamine in 600 parts of chloroform. The resultant solution is allowed to stand at room temperature overnight. After precipitated solids are removed by filtration, the product is recovered from the filtrate by evaporation of the solvent. A crude yield of 33 parts is thus obtained. Upon recrystallization from ethyl acetate, the product is found to melt at 145.5° C. and is identified as hexahydro-2-phenoxy-1,3,2-diazaphosphorine-2-oxide. Additional product is recovered from the original filter cake by extraction with ethyl acetate.

By using an equivalent amount of methyl phosphorodichloridate in place of the phenyl compound used above, the hexahydro-2-methoxy-1,3,2-diazaphosphorine-2-oxide is obtained having a melting point of 86–89° C. after crystallization from toluene.

The above procedures can be used in preparing all the various diazaphosphorus cyclic ring compounds of this invention by using phosphoryl dihalides in which the diphenylamino or other R' radical of the phosphoryl dihalide used in Examples I and II is replaced by various —NR''$_2$, —NHR'', OR'' and R'' radicals as defined and illustrated above for the R' radical.

By these procedures, the following typical compounds are prepared:

2-dimethylamino-hexahydro-1,3,2-diazaphosphorine-2-oxide
2-dicyclohexylamino-hexahydro-1,3,2-diazaphosphorine-2-oxide
2-dibenzylamino-hexahydro-1,3,2-diazaphosphorine-2-oxide
2-ethyl-hexahydro-1,3,2-diazaphosphorine-2-oxide
2-amyl-hexahydro-1,3,2-diazaphosphorine-2-oxide
2-cyclopentyl-hexahydro-1,3,2-diazaphosphorine-2-oxide
2-naphthyl-hexahydro-1,3,2-diazaphosphorine-2-oxide
2-cyclohexyl-hexahydro-1,3,2-diazaphosphorine-2-oxide
2-tolyl-hexahydro-1,3,2-diazaphosphorine-2-oxide
2-butyl-hexahydro-1,3,2-diazaphosphorine-2-oxide
2-octyl-hexahydro-1,3,2-diazaphosphorine-2-oxide
2-allyl-hexahydro-1,3,2-diazaphosphorine-2-oxide
2-(p-allylphenyl)-hexahydro-1,3,2-diazaphosphorine-2-oxide
2-cyclopentadienyl-hexahydro-1,3,2-diazaphosphorine-2-oxide
2-butadienyl-hexahydro-1,3,2-diazaphosphorine-2-oxide
2-propargyl-hexahydro-1,3,2-diazaphosphorine-2-oxide
2-cyclohexenyl-hexahydro-1,3,2-diazaphosphorine-2-oxide
2-methoxy-hexahydro-1,3,2-diazaphosphorine-2-oxide
2-phenoxy-hexahydro-1,3,2-diazaphosphorine-2-oxide
2-cyclohexoxy-hexahydro-1,3,2-diazaphosphorine-2-oxide
2-butoxy-hexahydro-1,3,2-diazaphosphorine-2-oxide
2-allyloxy-hexahydro-1,3,2-diazaphosphorine-2-oxide
2-tolyloxy-hexahydro-1,3,2-diazaphosphorine-2-oxide
2-dicyclohexylamino-1,3,2-diazaphospholidine-2-oxide
2-dimethylamino-1,3,2-diazaphospholidine-2-oxide
2-dibenzylamino-1,3,2-diazaphospholidine-2-oxide
2-ethyl-1,3,2-diazaphospholidine-2-oxide
2-amyl-1,3,2-diazaphospholidine-2-oxide
2-phenyl-1,3,2-diazaphospholidine-2-oxide
2-cyclopentyl-1,3,2-diazaphospholidine-2-oxide
2-tolyl-1,3,2-diazaphospholidine-2-oxide
2-butyl-1,3,2-diazaphospholidine-2-oxide
2-octyl-1,3,2-diazaphospholidine-2-oxide
2-allyl-1,3,2-diazaphospholidine-2-oxide
2-(p-allylphenyl)-1,3,2-diazaphospholidine-2-oxide
2-cyclopentadienyl-1,3,2-diazaphospholidine-2-oxide
2-butadienyl-1,3,2-diazaphospholidine-2-oxide
2-propargyl-1,3,2-diazaphospholidine-2-oxide
2-cyclohexenyl-1,3,2-diazaphospholidine-2-oxide
2-methoxy-1,3,2-diazaphospholidine-2-oxide
2-phenoxy-1,3,2-diazaphospholidine-2-oxide
2-cyclohexoxy-1,3,2-diazaphospholidine-2-oxide
2-butoxy-1,3,2-diazaphospholidine-2-oxide
2-allyloxy-1,3,2-diazaphospholidine-2-oxide
2-tolyloxy-1,3,2-diazaphospholidine-2-oxide Example IV The monolithium salt of 2-diphenylamino-1,3,2-diazaphospholidine-2-oxide is prepared using 2.78 parts of the oxide and 1.21 parts of butyl lithium in sodium-dried benzene. The corresponding monosodium salt is prepared by reaction of the heterocyclic base with NaNH$_2$ in an inert solvent such as benzene. The corresponding monopotassium salt is prepared with KNH$_2$ in an inert solvent such as benzene.

Example V

The procedures of Examples I and II are repeated using in place of the diphenyl phosphoramidic dichloride compound of those examples the corresponding compounds in which the diphenylamino group is replaced by the following groups: —N(CH$_3$)$_2$; —N(C$_2$H$_5$)$_2$; —N(C$_6$H$_{13}$)$_2$; —N(C$_6$H$_{11}$)$_2$; —N(C$_5$H$_5$)$_2$; —C$_6$H$_5$; —CH$_3$; —C$_4$H$_9$; —C$_6$H$_{11}$; —OCH$_2$CH$_3$; —OC$_6$H$_4$—CH$_3$; —OC$_6$H$_{11}$.

In each case the resultant compound corresponds in structure to that shown in the respective examples except that the product has the diphenylamino group replaced by the respective groups recited above.

For example, the following typical specific compounds are obtained:

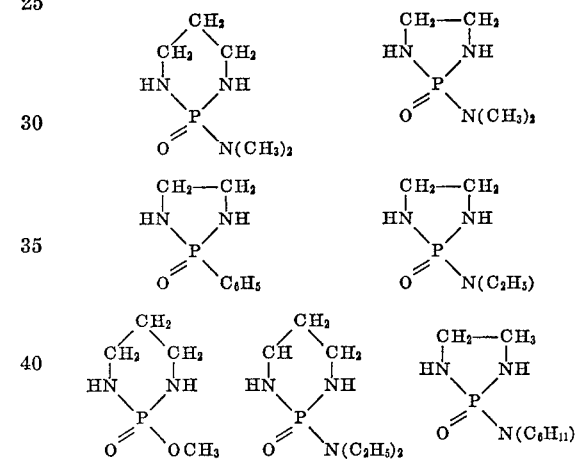

To form the polymers disclosed in applicant's copending application Ser. No. 398,083 the heterocyclic compounds are condensed by reaction with one or more "condensing" reagents of the formula: SiX$_4$, wherein X is a halogen atom, e.g. Cl, Br, I or F, or an R'' or OR'' radical in which R'' is as defined above and the reagent contains at least two halogen atoms. Since these monomers are cyclic, steric restriction prevents formation of rings during polymerization, so that only polymer chains are produced by the condensation.

For many of the purposes for which these polymers are used such as textiles, clothing, protective coatings, etc., the R' group of the starting diazaphosphorus compound and of the resulting polymer are preferably —NR''$_2$ groups because of the greater strength or toughness characteristics, dyeability, solvent resistance, etc. imparted by the compounds and polymers having such groups.

The corresponding metallic compounds, in which one of the hydrogens attached to the ring nitrogen in the general formula is replaced by sodium, potassium or lithium, are prepared by reacting NaNH$_2$, KNH$_2$, or LiNH$_2$ with the various compounds illustrated above representing hydrogen. Other bases can also be used such as lithium alkyls, NaH, NaCH$_2$SOCH$_3$, Na phenyl, etc.

In addition to their use in polymer formation the compounds of this invention are useful for a number of other purposes such as irreversible buffers (hydrolyze in acid pH 5 giving amines), in situ source of phosphonic, phosphoric or alkyl- or aryl-phosphonic acids in acidic media, flame retarding agents, components of soldering and brazing fluxes for copper and certain copper alloys.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A compound having the formula

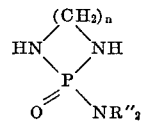

wherein
R" is a hydrocarbon radical selected from the class consisting of:
  (a) an alkyl radical having 1–20 carbon atoms,
  (b) an alkenyl, an alkadienyl, or an alkynyl radical having 2–6 carbon atoms,
  (c) a cycloalkyl or a cycloalkenyl radical having 5–6 carbon atoms or an alkyl derivative thereof having 1–8 carbon atoms in the alkyl moiety thereof,
  (d) phenyl, naphthyl, or biphenyl radical, or alkyl or alkenyl derivative thereof having 1–8 carbon atoms in the alkyl moiety or alkenyl moiety thereof, or
  (e) benzyl or cyclopentadienyl radical, $n$ is an integer having a value no less than 2 and no more than 3.

2. A compound having the formula

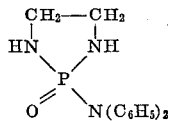

3. A compound having the formula

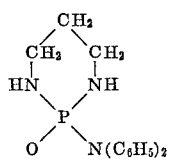

4. A compound having the formula

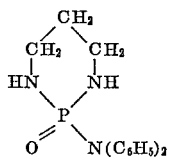

5. A compound having the formula

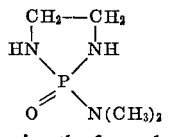

6. A compound having the formula

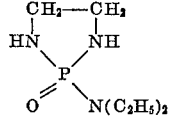

7. A compound having the formula

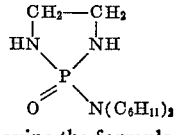

8. A compound having the formula

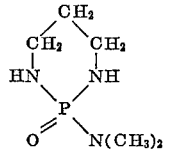

References Cited

FOREIGN PATENTS 1,131,892  12/1962  Germany.

OTHER REFERENCES

Autenrieth et al. Ber., vol 58, pp. 2144–50 (1925).
Chem. Abst., vol. 55, col. 16817f (1961).

HENRY R. JILES, Primary Examiner

HARRY I. MOATZ, Assistant Examiner

U.S. Cl. X.R.

75—72, 94; 252—8.1; 260—2, 502.4, 563, 936